Aug. 3, 1954  E. WILLIAMS  2,685,392
WEAR DEMONSTRATING OR DISPLAY BUST FORM
Filed March 12, 1952  2 Sheets-Sheet 2
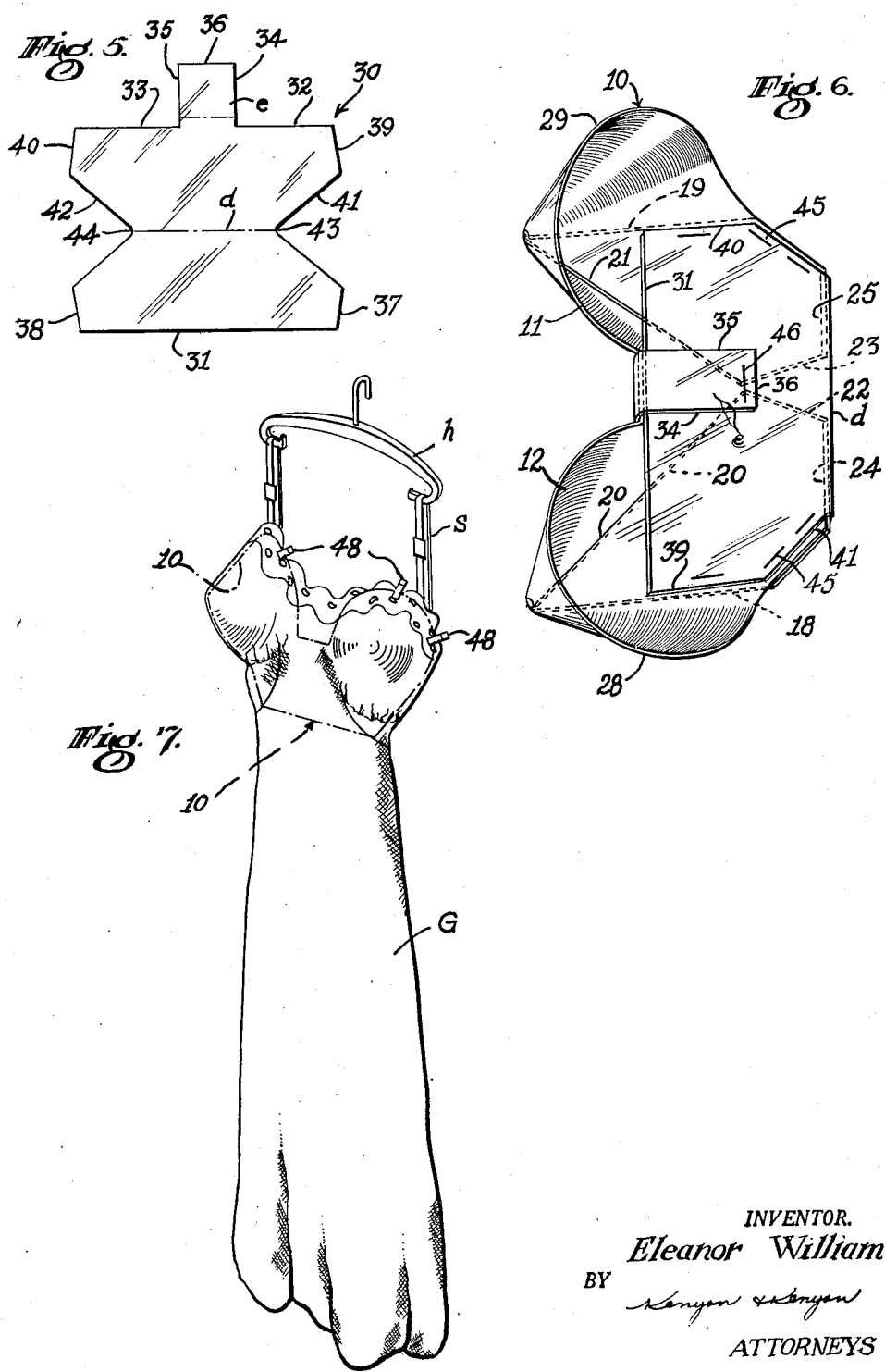
INVENTOR.
Eleanor Williams
BY
ATTORNEYS Patented Aug. 3, 1954

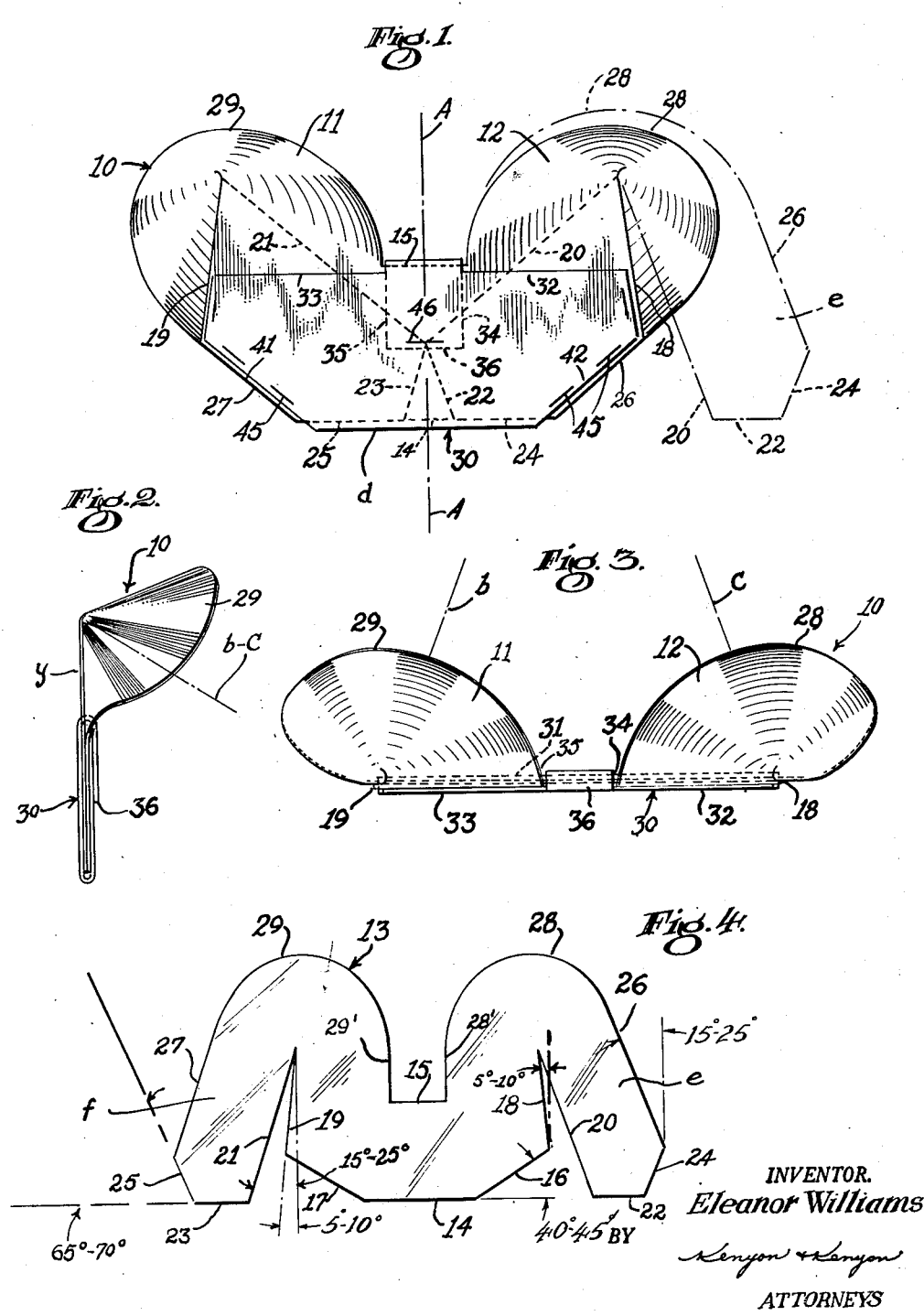

2,685,392

UNITED STATES PATENT OFFICE 2,685,392

WEAR DEMONSTRATING OR DISPLAY BUST FORM

Eleanor Williams, Harrison, N. Y., assignor to The Barbizon Corporation, New York, N. Y., a corporation of New York Application March 12, 1952, Serial No. 276,163

6 Claims. (Cl. 223—68)

This invention relates to display forms for inner and outer women's garments.

Objects and features of the invention are the provision of display forms for use with inner and outer garments by sales people and demonstrators to enhance the display sales appeal of such garments and to show prospective purchasers the form fitting or body molding qualities of the garments.

Other objects and features of the invention are the provision of display forms of the kind described for demonstration particularly of the upper or bust covering portions of inner and outer garments, the said forms being easily and quickly transferable from garment to garment during their display to prospective purchasers to enable the latter to visualize more readily the actual appearance of the garment as it would be worn, for example by the particular purchaser viewing it in display.

Further objects and features of the invention are to provide display forms of the kind mentioned that are simply and cheaply manufactured. The invention also contemplates the provision of display forms corresponding to conventionally different sizes of garments manufactured so that use of a particular one of such display forms will illustrate with fair exactitude the appearance when worn of a particularly sized garment.

Other objects and features of the invention will become apparent from the following specification and the accompanying drawings wherein:

Fig. 1 is a front elevational view of a display form embodying the invention;

Fig. 2 is a side elevational view thereof;

Fig. 3 is a top plan view thereof;

Fig. 4 is a plan view of one of the pattern pieces for making the display form;

Fig. 5 is a plan view of the second pattern piece for making the display form;

Fig. 6 is a perspective view of the display form made of the two pattern pieces; and Fig. 7 is a perspective illustration of a manner of use of the display form in connection with a woman's garment.

Referring to the drawing, 10 denotes the display form embodying the invention. The form 10 includes a pair of bust elements 11 and 12 symmetrically disposed relative to the vertical center line A—A of the form and spaced apart at a distance representing the usual position and spacing between normal breasts of a wearer having breasts of the size intended to be simulated by said bust elements 11 and 12. The spacing between elements 11 and 12 and their size will vary depending upon the size the display form 10 is intended to simulate. Each of the bust elements 11 and 12 is substantially conically shaped and their generating axes $b$ and $c$ from their respective apices are convergent and slope downwardly relative to the front plane $y$ of the form 10, so that when the form 10 is suspended with its plane $y$ in a substantially vertical position, the two bust elements 11 and 12 occupy substantially the usual pendulous positions of the right and left breasts of the wearer, while the front plane $y$ simulates the diaphragm portion of the wearer's body.

The display form 10 is preferably made of two pieces of transparent, translucent or opaque material, for example, cellulose acetate sheeting or the like of sufficient thickness to provide durability and at same time of sufficient pliability when cut to shape to permit deformation, bending and assembly into the shape of the display form 10.

One of the two pieces, namely pattern piece 13 is shown in Fig. 4. This piece 13, of the sheet material mentioned, has a substantially horizontal lower edge 14 and a parallelly disposed upper edge 15 of shorter length than edge 14, centered relative to the latter. Edges 16 and 17 sloping upwardly in opposite directions at approximately 40–45° relative to the horizontal extend from opposite ends of the edge 14. Edges 18 and 19 making oppositely directed angles of approximately 5–10° with the vertical, extend upwardly from the outer ends of edges 16 and 17. Edges 20 and 21 making oppositely directed angles of approximately 15–25° with the vertical extend downwardly from the upper ends of edges 18 and 19 making acute angles therewith and are joined respectively to the horizontally disposed edges 22 and 23 that are aligned with bottom edge 14. Outwardly and upwardly sloping edges 24 and 25 making angles of approximately 65–70° with the horizontal extend respectively from the outer ends of horizontal edges 22 and 23 and meet the lower ends of respective inwardly and upwardly sloping edges 26 and 27 which latter make angles of approximately 15–25° with the vertical being in parallelism with edges 20 and 21. The upper ends of edges 26 and 27 are joined respectively by the curvilinear edges 28 and 29 to the outer ends of vertical edges 28' and 29' whose lower ends join the opposite ends of upper edge 15, so that the various edges 14–29', inclusive, just described define the contour of pattern piece 13 which may roughly be described as an inverted W, whose outer appendage or leg portions e and f are defined respectively by edges 20, 22, 24, 26 and 21, 23, 25 and 27.

The second pattern piece 30 is shown in Fig. 5 and is made preferably of the same material as piece 13. It is designed primarily to act as a reinforcement for the first piece 13. As shown, it has a substantially horizontal bottom edge 31, and substantially horizontal upper edge portions 32, 33 joined at their inner ends to vertical edges 34, 35, which in turn are connected by the horizontal edge portion 36. Upward, outwardly, oppositely sloping side edge portions 37, 38 are connected to the opposite outer ends of the bottom edge 31. Downward, outwardly oppositely sloping side edge portions 39 and 40 are connected to the respective outer ends of upper edge portions 32 and 33. The respective pairs of side edge portions 37, 39 and 38, 40 are joined at their outer ends by the substantially V-shaped side edge portions 41, 42 whose respective apices 43, 44 are alined substantially along a mid-horizontal line d between the bottom edge 31 and upper edge portions 32 and 33. The edges 31—42 define the piece 30 which may be described roughly as a parallelogram with oppositely directed V-shaped side edge sections and with a centrally located tab on its upper edge.

In assembling the pieces 13 and 30 to provide the form 10, the outer appendage or leg portion e of piece 13 defined by edges 20, 22, 24 and 26 is deformed or bent conically or curvilinearly to close the dart defined by edges 18 and 20 bringing edge 20 under edge 18 and carrying it beyond the latter until edge 24 lies parallelly alined with the edge 14 in plane portion y. This forms bust element 12. Similarly the outer appendage or leg portion f of piece 13 defined by edges 21, 23, 25 and 27 is deformed or bent conically or curvilinearly to close the dart defined by edges 19 and 21 bringing edge 21 under edge 19 and carrying it beyond the latter until edge 25 lies parallelly aligned with the edge 14 in plane portion y. This forms bust element 12.

Piece 30, previously folded along horizontal line d which has a length equal substantially to the length of bottom edge 14 is slipped over said bottom edge so that the fold line d engages bottom edge 14 and the sides of piece 30 embrace the deformed appendage or leg portions e and f of piece 13. Fastening members such as staples 45 are applied in parallelism with and adjacent the edges 16 and 17 to hold the assembled parts together and in the described deformed condition. The flap defined by edges 34, 35 and 36 in piece 30 is then folded over the upper edge 15 of piece 13 along line e and secured as by the staple or fastening member 46 both to the pieces 13 and 30, care being taken to include the corners defined by edges 22, 24 and 23, 25 in the clinching action of staple 46. The deformation of outer appendage or leg portions e and f of piece 13 described and their fastening in deformed condition provides the bust elements 11 and 12 in the finished display form 10. The piece 30 acts as a stiffener to maintain a substantially plane shape in the diaphragm portion y of form 10 connecting the two bust elements 11 and 12. Piece 30 may be omitted entirely if the sheet material of piece 13 is sufficiently stiff. In the alternative, other stiffening arrangements may be provided to maintain a rigid condition of the deformed piece 13. Likewise, gumming or pasting may be utilized in place of staples for securing the parts in assembled condition.

As a further embodiment the entire display form 10 may be molded of suitable plastic or other material to the shape shown in Figs. 1–3 and 6, thereby eliminating entirely any need for the separate pattern pieces 13 and 30. Such construction, however, requires molding dies and would probably be more expensive to produce. The simple provision of pattern pieces 13 and 30 whose dimensions may be readily changed to insure formation of differently sized display forms 10 as required is believed to be a less expensive way of providing said display forms quantitatively in needed variable commercial sizes.

In use the display form 10 of required size, which may be equipped with appropriate clasps 48, is simply secured by the latter inside the garment g which it is intended to demonstrate or display. The garment g may then be hung by its shoulder straps s from any conventional type of hanger h to display it effectively to the prospective purchaser of the garment in a manner closely simulating the latter's appearance in actual wear.

While specific embodiments of the invention have been described and shown variations in structural detail within the scope of the claims are possible and are contemplated. There is no intention, therefore, of limitation to the exact details shown and described.

What is claimed is:

1. For use in displaying female garments as a merchandising aid to enable a prospective user to visualize the appearance of garments on the user when worn by such user, a display bust form temporarily and removably attachable to successive garments being displayed to said user and including a substantially flat plane portion simulating the diaphragm region of the body and including bust elements located in usual breast positions relative to said plane portion, said bust elements having axes of generation that are convergent and extend downwardly and rearwardly relative to said flat plane portion, said form comprising a member of sheet material that is symmetrically shaped relative to a vertical center line and including oppositely located leg portions that are bent conically to lie against said plane portion thereby forming said bust elements and means for securing said oppositely located leg portions in their conically bent condition to said plane portion.

2. For use in displaying female garments as a merchandising aid to enable a prospective user to visualize the appearance of garments on the user when worn by such user, a display bust form temporarily and removably attachable to successive garments being displayed to said user and including a plane portion simulating the diaphragm region of the body and including bust elements located in usual breast positions relative to said plane portions, said bust elements having axes of generation that are convergent and extend downwardly and rearwardly relative to said plane portion, said form comprising sheet material symmetrically shaped relative to a vertical center line and including oppositely located bust forming leg portions that are bent conically to lie in part coextensive with said plane portion thereby forming said bust elements, and a second member of sheet material lying coextensive with the plane portion of said first member and secured to it and to the bent leg portions of said first member to reinforce the latter and to maintain its bent leg portions in their bent positions, and fastening means for temporarily attaching said form to a garment.

3. A display bust form for use in demonstrating female garments as a merchandising aid to enable a prospective user to visualize the appearance of garments on the user when worn by such user, including a portion generally simulating the diaphragm region of a female human body and a pair of bust portions located and positioned to correspond to the usual female breast positions relative to said first-named portion, said form comprising a member of sheet material symmetrically shaped relative to a vertical center line and including oppositely located leg portions bent curvilinearly to lie against the first-named portion, means for securing the curvilinearly bent leg portions to said first-named portion, said form being temporarily attachable to successive garments to be displayed to said user, and fastening means for temporarily securing said form in place in a garment.

4. The display form of claim 3 wherein said means for securing the curvilinearly bent leg portions to said first-named portion includes a second member of sheet material secured to said first member and lying substantially coextensive with the first-named portion of said first member and embracing parts of the curvilinearly bent leg portions of said first member.

5. A wear demonstrating bust form temporarily attachable to successive female garments for use in merchandising of said garments to enable a prospective user to visualize the appearance of successive of said garments on the user when worn by such user, consisting of a member of sheet material, said sheet material being symmetrically shaped relative to a vertical center line and including a portion generally simulating the diaphragm region of a female human body, and appendage or leg portions oppositely located relative to said center line, said appendage or leg portions being bent curvilinearly toward each other to lie against the diaphragm-simulating portion symmetrically relative to said center line and to define a pair of bust elements of generally conical shape that are located and positioned relative to said diaphragm-simulating portion to correspond to the usual female breast positions relative to such diaphragm-simulating portion, said bust elements having axes of generation that are convergent and extend downwardly and rearwardly relative to the diaphragm-simulating portion, a second member of sheet material for reinforcement secured to the said diaphragm-simulating portion of said first member of sheet material and lying substantially coextensive therewith and folded to embrace the diaphragm-simulating portion and parts of the curvilinearly bent appendage or leg portions of said first member of sheet material, and means to secure said second member to said first member.

6. The wear demonstrating form of claim 5, including means for temporarily and removably attaching said form to successive garments.

References Cited in the file of this patent

UNITED STATES PATENTS

| Number | Name | Date |
| --- | --- | --- |
| 1,067,295 | Anderson | July 15, 1913 |
| 1,086,094 | Smith | Feb. 3, 1914 |
| 2,014,436 | Jacobson | Sept. 17, 1935 |
| 2,558,497 | Rosen | June 26, 1951 |